United States Patent
Griffin et al.

[15] 3,675,621
[45] July 11, 1972

[54] DEVICE FOR REMOVING EXCESS LIQUID COATING FROM A MOVING FABRIC

[72] Inventors: Theodore F. Griffin, Barberton; Grover W. Rye, Cuyahoga Falls, both of Ohio

[73] Assignee: The Goodyear Tire & Rubber Company, Akron, Ohio

[22] Filed: July 24, 1970

[21] Appl. No.: 58,029

[52] U.S. Cl. ...................................................... 118/122
[51] Int. Cl. ............................................................ B05c 11/04
[58] Field of Search ................... 118/DIG. 18, DIG. 21, 121, 118/122, 123; 15/256.51; 117/102, 64

[56] References Cited

UNITED STATES PATENTS

| | | |
|---|---|---|
| 2,489,985 | 11/1949 | Speight, Jr. ..................... 118/122 UX |
| 3,241,521 | 3/1966 | Labombarde ....................... 118/122 |
| 2,326,249 | 8/1943 | Nokes ................................. 118/122 |
| 3,245,378 | 4/1966 | Caple et al ......................... 118/126 |
| 157,687 | 12/1874 | Johns ............................. 118/122 X |
| 2,338,438 | 1/1944 | Keller .............................. 118/122 |

FOREIGN PATENTS OR APPLICATIONS

| | | |
|---|---|---|
| 309,866 | 1/1930 | Great Britain ..................... 118/123 |
| 982,361 | 2/1965 | Great Britain ................... 15/256.51 |

*Primary Examiner*—Morris Kaplan
*Attorney*—F. W. Brunner and Harlan E. Hummer

[57] ABSTRACT

A pair of specially configured scraper blades mounted for rotating into and out of compressive wiping engagement with a fabric, previously dipped in a liquid coating, to remove excess liquid from the fabric. An air cylinder, or spring, is utilized to maintain curved lips of the scraper blades in predetermined compressive relation with the moving fabric.

17 Claims, 4 Drawing Figures

PATENTED JUL 11 1972 3,675,621

INVENTORS
THEODORE F. GRIFFIN
BY GROVER W. RYE

Harlan E. Hummer
ATTORNEY

PATENTED JUL 11 1972 3,675,621

INVENTORS
THEODORE F. GRIFFIN
GROVER W. RYE
BY
Harlan E. Hemme
ATTORNEY

DEVICE FOR REMOVING EXCESS LIQUID COATING FROM A MOVING FABRIC

BACKGROUND OF THE INVENTION

The invention is particularly well suited for use in a process for treating or conditioning fabric designed for reinforcing rubberized material used in the production of pneumatic tires. Such fabric is generally coated with a liquid adhesive for increasing the adhesion between the fabric and rubberized material. This is usually accomplished by dipping the fabric in a tank containing liquid adhesive and then drying the fabric. It is important to remove excessive liquid coating from the fabric. Otherwise, webbing resulting from the drying of liquid adhesive entrained between adjacent warp cords, occurs and this is detrimental to the bond between the fabric and rubberized material.

Opposing rollers and staggered scrapers with knife edges for engaging the fabric, are some devices which have been used for removing excessive liquid adhesive from tire cord fabric, prior to passing the fabric through a standard dewebber. However, the liquid adhesive has a tendency to dry and build up on the rollers causing them to function improperly, thereby making it mandatory to periodically remove the rollers and scrape the accumulated dried liquid adhesive from the rubberized surfaces of the rollers before they can be reused. Moreover, it has been found that the staggered scraper blades merely push or move the liquid adhesive from one side of the fabric to the other, and do not adequately remove excessive adhesive to eliminate webbing of the fabric. The invention is directed to providing a device for removing sufficient excessive liquid adhesive from the fabric such that webbing is eliminated or substantially reduced.

Briefly stated, the invention is in a device for removing excess liquid from a moving fabric, which has been previously dipped in a liquid coating material. The device comprises a pair of configured scraper blades having oppositely disposed curved lips converging into contacting wiping relation with fabric passed therebetween. The curve of each lip, prior to the point of contact with the fabric, is sufficiently long and close to the fabric to cause build-up of excess liquid coating between the lips before, and not beyond the point of contact, thereby preventing the build-up of dried liquid coating on the lips beyond the point of contact with the fabric. Means are provided for maintaining the lips in predetermined compressive relation against the fabric to squeegee or wipe excess liquid from the fabric.

DESCRIPTION OF THE DRAWING

The following description of the invention will be more readily understood by having reference to the annexed drawing, wherein.

DESCRIPTION OF THE INVENTION

Figure 1:
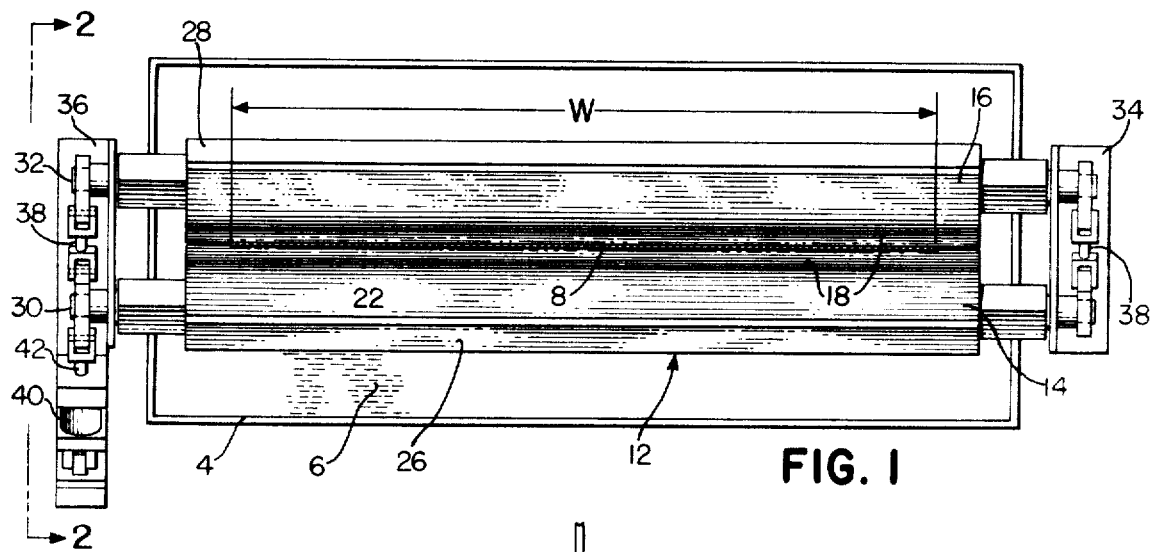
FIG. 1 is a plan view of the dip tank and scraper blade assembly for removing excessive liquid coating from the fabric.
Figure 2:
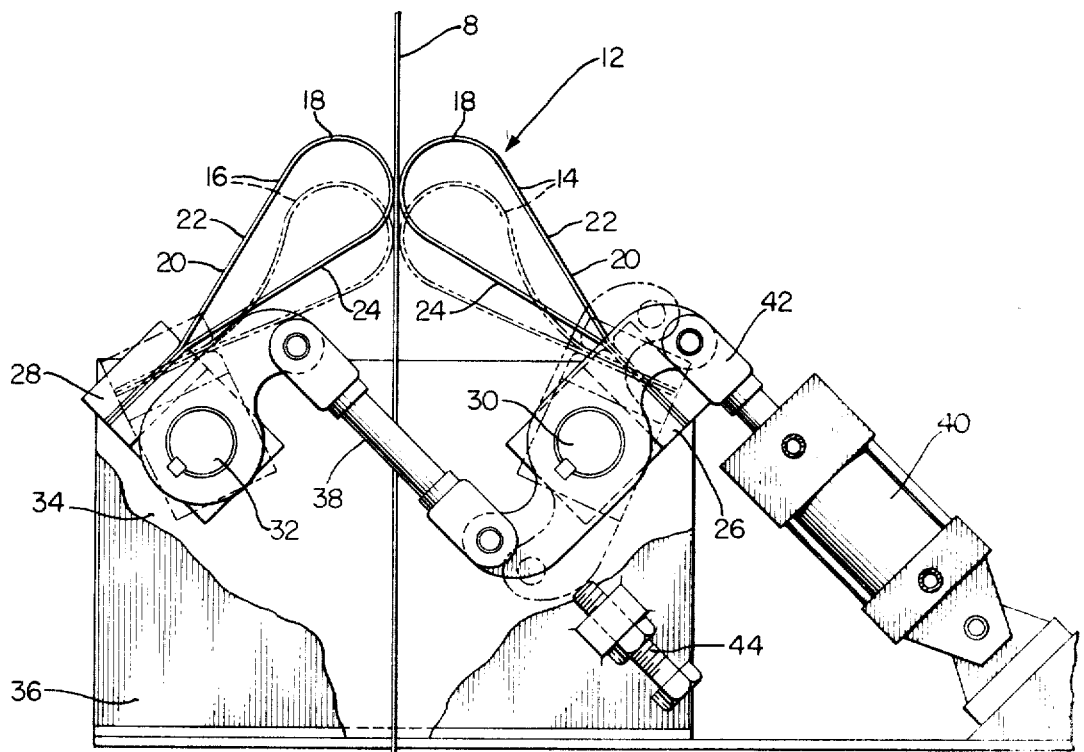
FIG. 2 is a view of the dip tank and scraper blade assembly from the line 2—2 of FIG. 1, the scraper blade assembly being enlarged for clarification.

Referring generally to the drawing and more particularly to FIGS. 1 and 2, there is shown a dip tank 4 for holding any suitable liquid adhesive 6 for increasing the bond, or adhesion between a tire cord fabric 8 and rubberized material used in the production of pneumatic tires. A roller 10 is at least partially submerged in the liquid adhesive 6, for directing the moving fabric 8 into liquid coating engagement with the adhesive 6 disposed in the dip tank 4.

The liquid coated fabric 8 moves from the dip tank 4 upwards towards a scraper blade assembly, generally indicated at 12, for removing excess adhesive from the fabric 8, thereby eliminating or substantially reducing webbing, which is detrimental to the bond between the fabric 8 and rubberized material. The scraper blade assembly 12 is preferably spaced a sufficient distance above the dip tank 4, that the force of gravity provides an initial wiping action to remove some of the excess adhesive.

The scraper blade assembly 12 comprises a pair of specially configured scraper blades 14 and 16, which are mounted on either side of the moving fabric 8 and movable into contacting wiping relation with the moving fabric 8. The scraper blades 14 and 16 are composed of any suitable material, e.g., 22-gauge stainless steel. The scraper blades 14 and 16 are at least coextensive with the width W of the tire cord fabric 8, and each preferably have a tear-shaped configuration, including a bulbous portion 18 and a tri-angular portion 20 whose tapering or converging sides 22 and 24 are generally flat.

The scraper blades 14 and 16 are clamped on a set of elongated brackets 26 and 28, which are keyed for unitary rotation with a pair of pivot pins 30 and 32 mounted for rotation between a couple of plates 34 and 36, which are secured in fixed parallel relation above the dip tank 4 on either side of the moving fabric 8. A specially designed linkage, generally indicated at 38, is provided for coupling the pivot pins 30 and 32 together for unitary rotational movement in opposing directions.

An air cylinder 40 and operating piston 42 are con-nected to the linkage 38 for rotating the scraper blades 14 and 16 in unison towards and away from the moving fabric 8. The air cylinder 40 is also utilized for maintaining the scraper blades 14 and 16 in predetermined compressive relation against the moving fabric 8. A spring mechanism, e.g., coil spring, can be used in place of the air cylinder 40 and and piston 42 for biasing the scraper blades 14 and 16 against the moving fabric 8. The strength of the spring can be designed, or adjusted to provide a predetermined wiping or squeegee force against opposing sides of the fabric 8 as it moves between the scraper blades 14 and 16. This biasing action of the air cylinder 40 or spring, is especially helpful in maintaining the scraper blades 14 and 16 in wiping relation with the moving fabric 8 when splices or knots in the fabric pass between the blades.

A stop mechanism 44 is provided for engaging the linkage 38 to control or regulate rotational movement of the scraper blades 14 and 16.

Figure 3:
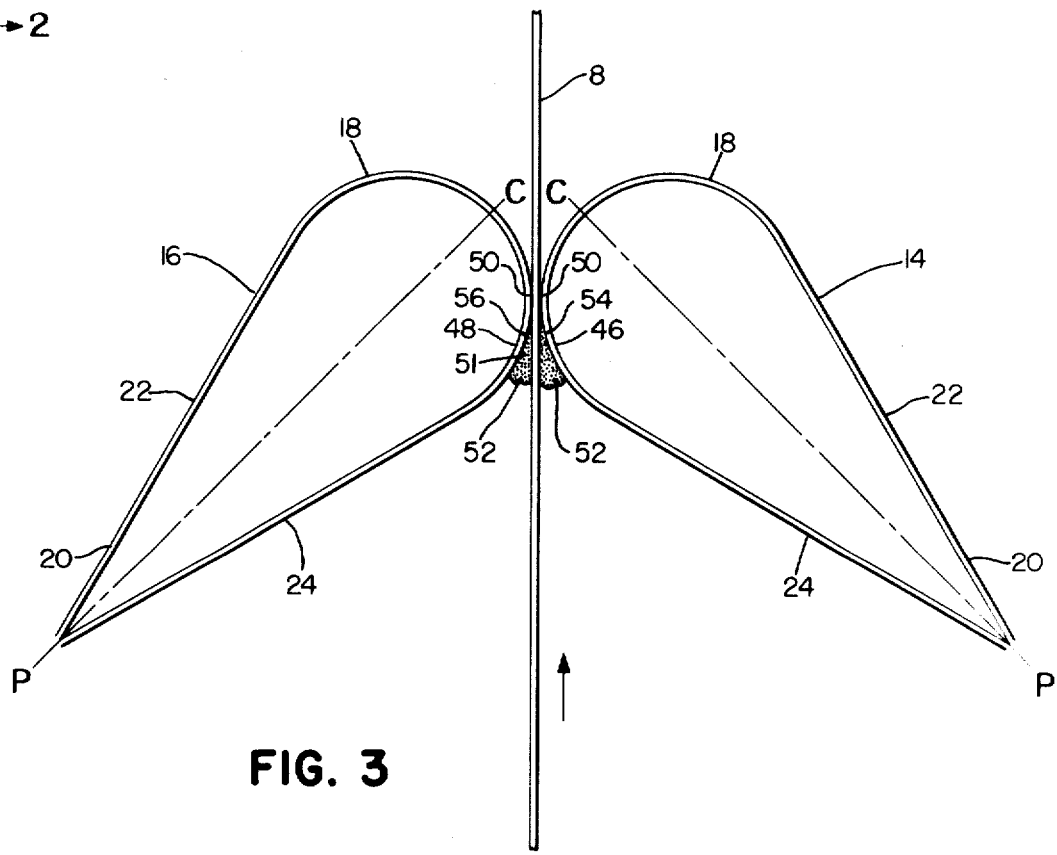
FIG. 3 is an enlarged view of the scraper blades.

The bulbous portions 18 (FIG. 3) of the scraper blades 14 and 16 are preferably semi-circular and provide a pair of curved lips 46 and 48, which are preferably flexible and converge into contacting, wiping engagement with the moving fabric 8. The curve of the lips 46 and 48 upstream from, or prior to the point 50 of contact with the moving fabric 8, is sufficiently long and close to the fabric 8 to form a long tapering neck 51 in which excess liquid adhesive 52 builds up. Thus, any excess liquid adhesive 52 removed from the moving fabric 8, settles between the lips 46 and 48 before, and not beyond the point 50 of contact with the fabric 8, thereby preventing build-up of dried, liquid adhesive on the lips 46 and 48 downstream, or beyond the point 50 of contact with the moving fabric 8.

The accumulation of excess liquid adhesive 52 between the lips 46 and 48, is helpful for coating the fabric 8 evenly or uniformly with adhesive. The pressure of the lips 46 and 48 against the fabric 8, mechanically deforms the warp or tire cords of the fabric 8 and helps squeeze adhesive into the compressed and slightly flattened cords, thereby increasing the penetration of the adhesive into the cords and fabric 8 to provide a more thorough coating of the individual strands or filaments of the warp cords. Moreover, the adjacent contacting surfaces of the lips 46 and 48 are always kept wet or moistened and, consequently, dried adhesive will not build up on the adjacent innerfaces 54 and 56 of the lips 46 and 48 to hamper the squeegee action of the scraper blades 14 and 16 in removing excess adhesive from the moving fabric 8.

The scraper blades 14 and 16, when contacting the moving fabric 8, are disposed at opposing similar angles preferably in the range of from about 30° to about 60° measured from the plane of the moving fabric 8 to a plane C-P passing through the longitudinal centerline of the scraper blades 14 and 16 and bisecting the blades. The scraper blades 14 and 16 are composed of sufficiently thin gauge material which deflects when greater rotational forces are applied by the air cylinder 40 and operating piston 42 (see dotted position in FIG. 2 of blades).

Figure 4:
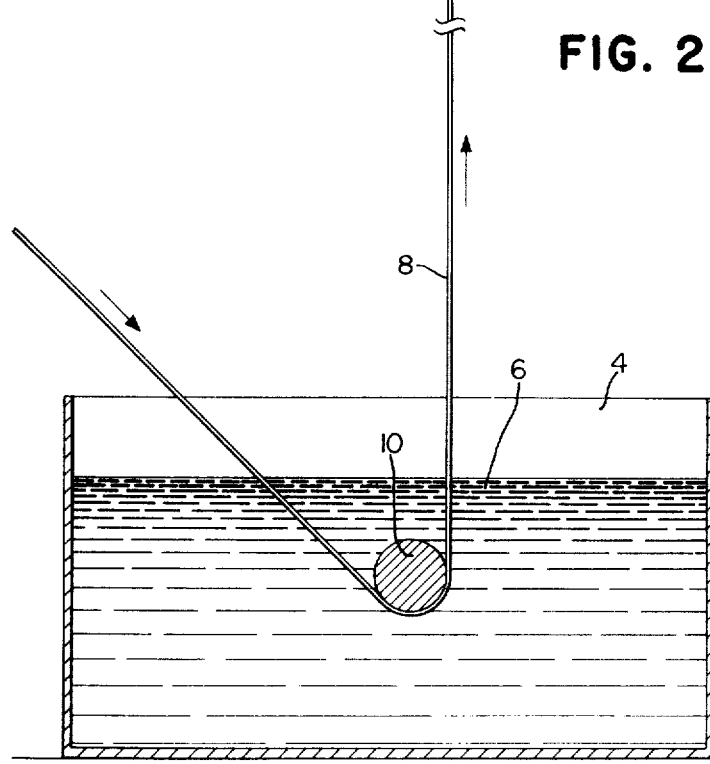
FIG. 4 is an enlarged view of another set of scraper blades suitable for use in the assembly
Figure 4:
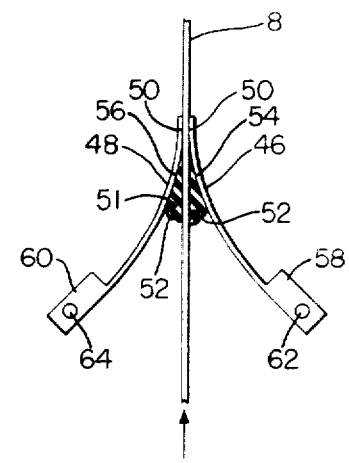

The lips 46 and 48 (FIG. 4) extend from a pair of comparatively rigid frames 58 and 60, which are mounted on pivot pins 62 and 64 for rotating or moving the lips 46 and 48 into and out of compressive wiping relation with the moving fabric 8. The lips 46 and 48, in this embodiment, are flat strips or sheets of any suitable flexible material, e.g., polyvinyl chloride or elastomeric material, such as rubber. In any case, the flat strips become appropriately curved or contoured, as previously described, when they are moved into compressive relation with the fabric. This particular embodiment generally provides greater contact between the lips and fabric than the tear-shaped scraper blades as previously described. Moreover, the flat, flexible lips 46 and 48 can be easily clamped to the rigid frames 58 and 60 for quick removal and replacement.

Thus, there has been provided a pair of scraper blades with long, tapering, squeegee-like flexible lips for removing excess liquid adhesive from a fabric composed of warp tire cords suitable for reinforcing pneumatic tires. The lips can be fabricated to the assembly, such that they are easily removed for cleaning and replacing.

While certain representative embodiments and details have been shown for the purpose of illustrating the invention, it will be apparent to those skilled in the art that various changes and modifications may be made therein without departing from the spirit or scope of the invention.

What is claimed is:

1. A device for removing excess liquid from a moving fabric coated with said liquid, comprising:
   a. a pair of spaced pivots;
   b. a pair of blades mounted for at least limited rotation about the pivots, the blades including a pair of sides secured to the pivots and converging therefrom, the converging sides terminating in a pair of oppositely curved lips for contacting fabric passed therebetween and wiping excessive liquid from the fabric, the lips converging toward each other prior to contacting the fabric, and diverging away from each other after contacting the fabric, the curve of the lips, prior to contacting the fabric being sufficiently long and close to the fabric to cause excess liquid removed from the fabric to build up between the lips before, and not beyond, contact with the fabric;
   c. means for securing ends of the sides opposite the lips to the pivots; and
   d. means for maintaining the lips in compressive relation against fabric passed therebetween.

2. The device of claim 1, wherein the blades are at least coextensive with the width of fabric passed therebetween.

3. The device of claim 2, wherein the means (b) includes a cylinder and operating piston coupled to at least one of the blades for rotating said blade.

4. The device of claim 2, wherein the means (b) includes a spring for biasing the lips in predetermined compressive engagement with the moving fabric.

5. The device of claim 2, wherein each blade has a tear-shaped configuration, and the lips are formed by bulbous portions of the tear.

6. The device of claim 2, wherein the converging lips form a tapering neck for receiving excess liquid removed from the fabric.

7. The device of claim 2, wherein the lips are flexible.

8. The device of claim 7, wherein the lips are composed of elastomeric material.

9. The device of claim 7, wherein the lips are composed of polyvinyl chloride.

10. The device of claim 7, wherein the lips are composed of thin gauge metal.

11. The device of claim 10, wherein the metal is stainless steel.

12. The device of claim 2, wherein the angular disposition between the blades is in the range of from about 60° to about 120°, when the blades are in touching, uncompressed relation against the fabric.

13. A device for removing excess liquid from a fabric coated with said liquid, comprising:
   a. a pair of tear-shaped blades at least coextensive with the width (W) of the fabric, each blade including a pair of sides converging from a bulbous portion, the bulbous portions forming oppositely curved flexible lips converging into contacting, wiping relation with liquid-coated fabric passing between the blades, a tapering neck being formed between the converging lips for holding excess liquid removed from the fabric, the lips diverging from each other after contacting the fabric;
   b. means for mounting the converging sides of each blade to a pivot about which the blade can be at least partially rotated; and
   c. means for maintaining the lips in predetermined compressive relation against fabric passed between the blades.

14. The device of claim 15, wherein the tapering neck is sufficiently long to keep excessive adhesive from passing beyond the area of contact between the lips and fabric, thereby preventing a build-up and drying of adhesive beyond said area of contact.

15. The device of claim 16, wherein the lips are composed of stainless steel.

16. The device of claim 16, wherein the lips are composed of polyvinyl chloride.

17. The device of claim 16, wherein the lips are composed of elastomeric material.

* * * * *

UNITED STATES PATENT OFFICE
CERTIFICATE OF CORRECTION

Patent No. 3,675,621　　　　　　　　Dated July 11, 1972

Inventor(s) Theodore F Griffin and Grover W Rye

It is certified that error appears in the above-identified patent and that said Letters Patent are hereby corrected as shown below:

Claims should read as follows:

3. The device of Claim 1, wherein the means (d) includes a cylinder and operating piston coupled to at least one of the blades for rotating said blade.

4. The device of Claim 1, wherein the means (d) includes a spring for biasing the lips in predetermined compressive engagement with the moving fabric.

14. The device of Claim 13, wherein the tapering neck is sufficiently long to keep excessive adhesive from passing beyond the area of contact between the lips and fabric, thereby preventing a build-up and drying of adhesive beyond said area of contact.

15. The device of Claim 14, wherein the lips are composed of stainless steel.

16. The device of Claim 14, wherein the lips are composed of polyvinyl chloride.

17. The device of Claim 14, wherein the lips are composed of elastomeric material.

Signed and sealed this 9th day of January 1973.

(SEAL)
Attest:

EDWARD M. FLETCHER, JR.　　　　　　　　ROBERT GOTTSCHALK
Attesting Officer　　　　　　　　　　　　Commissioner of Patents